(12) United States Patent
Shaikh et al.

(10) Patent No.: US 9,697,488 B1
(45) Date of Patent: Jul. 4, 2017

(54) SYSTEM AND METHOD FOR GENERATING PREDICTIONS FOR UNIT ALLOCATION IN A MATERIALS PROCESSING NETWORK

(75) Inventors: Qaseem Ahmed Shaikh, Bellevue, WA (US); Mikael O. Weigelt, Bainbridge Island, WA (US); Jiefeng Shen, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 1193 days.

(21) Appl. No.: 12/398,602

(22) Filed: Mar. 5, 2009

(51) Int. Cl.
*G06Q 10/06* (2012.01)
(52) U.S. Cl.
CPC .............................. *G06Q 10/06313* (2013.01)
(58) Field of Classification Search
USPC ......... 705/7.12, 7.13, 7.22, 7.26, 7.14, 7.35, 705/7.37, 22, 34; 715/714; 718/105; 370/468; 703/17
See application file for complete search history.

(56) References Cited

U.S. PATENT DOCUMENTS

| | | | |
|---|---|---|---|
| 5,630,070 A | | 5/1997 | Dietrich et al. |
| 6,151,582 A | * | 11/2000 | Huang et al. ................ 705/7.25 |
| 6,516,301 B1 | | 2/2003 | Aykin |
| 6,925,642 B1 | * | 8/2005 | Commander ................. 718/104 |
| 6,954,736 B2 | * | 10/2005 | Menninger et al. ............ 705/28 |
| 7,003,474 B2 | * | 2/2006 | Lidow .......................... 705/7.31 |
| 7,269,848 B2 | * | 9/2007 | Seshadri ................. G06F 21/31 370/351 |
| 7,337,031 B1 | | 2/2008 | Birjandi et al. |
| 7,627,493 B1 | * | 12/2009 | Sarthi et al. .................. 705/7.22 |
| 7,720,779 B1 | * | 5/2010 | Perry et al. ....................... 706/45 |
| 7,912,748 B1 | * | 3/2011 | Rosenberg et al. .......... 705/7.35 |
| 8,380,553 B2 | * | 2/2013 | Berger et al. ................ 705/7.13 |
| 2001/0041999 A1 | * | 11/2001 | Young et al. ...................... 705/8 |
| 2002/0042819 A1 | | 4/2002 | Reichert et al. |
| 2002/0120395 A1 | | 8/2002 | Smith |
| 2002/0133325 A1 | * | 9/2002 | Hoare et al. .................... 703/17 |
| 2002/0158864 A1 | * | 10/2002 | Matichuk ...................... 345/418 |
| 2003/0018502 A1 | * | 1/2003 | Rodriguez ........................ 705/7 |
| 2004/0064351 A1 | * | 4/2004 | Mikurak ........................... 705/7 |
| 2004/0161131 A1 | | 8/2004 | Rhoads |
| 2005/0034062 A1 | | 2/2005 | Bufkin et al. |

(Continued)

*Primary Examiner* — Thomas L Mansfield, Jr.
(74) *Attorney, Agent, or Firm* — Robert C. Kowert; Meyertons, Hood, Kivlin, Kowert & Goetzel, P.C.

(57) ABSTRACT

Various embodiments of a system and method for generating predictions for unit allocation in a materials processing network are described. Various embodiments may include a capacity planner for defining a model including, for each of a plurality of discrete periods of time, a corresponding representation of a materials processing network including materials handling facilities, constraints associated with ones of the materials handling facilities, and logic for determining efficient flows of materials within the materials processing network during that discrete period of time. In order to determine efficient flows of materials within the materials processing network for a particular period of time, the capacity planner may determine the discrete periods of time corresponding to representations of the model required to determine the one or more efficient flows, and evaluate the logic of the those representations without evaluating logic of representations of the model corresponding to other discrete periods of time.

27 Claims, 7 Drawing Sheets

(56) References Cited

U.S. PATENT DOCUMENTS

| | | |
|---|---|---|
| 2005/0107988 A1* | 5/2005 | Mohammed et al. ........ 702/186 |
| 2005/0259683 A1* | 11/2005 | Bishop et al. ................ 370/468 |
| 2005/0270288 A1 | 12/2005 | Arcas |
| 2005/0276440 A1 | 12/2005 | Rhoads et al. |
| 2006/0028234 A1 | 2/2006 | Marino et al. |
| 2006/0150189 A1* | 7/2006 | Lindsley ....................... 718/105 |
| 2007/0104378 A1 | 5/2007 | Aguera Y Arcas |
| 2007/0116325 A1 | 5/2007 | Rhoads et al. |
| 2007/0204226 A1* | 8/2007 | Hindi et al. .................. 715/714 |
| 2008/0016472 A1 | 1/2008 | Rohlf et al. |

* cited by examiner

SYSTEM AND METHOD FOR GENERATING PREDICTIONS FOR UNIT ALLOCATION IN A MATERIALS PROCESSING NETWORK

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as a materials handling facility). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations of inventory in the materials handling facilities, processed for shipping, and shipped as outbound shipments to the customers. A given materials processing network may include any number of such materials handling facilities in order to fulfill customer demand. Since inventory levels and customer demand for units of inventory items may vary over time, the manner in which inventory is to be allocated in the future among the materials handling facilities of a materials processing network may not be readily apparent.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Figure 2:
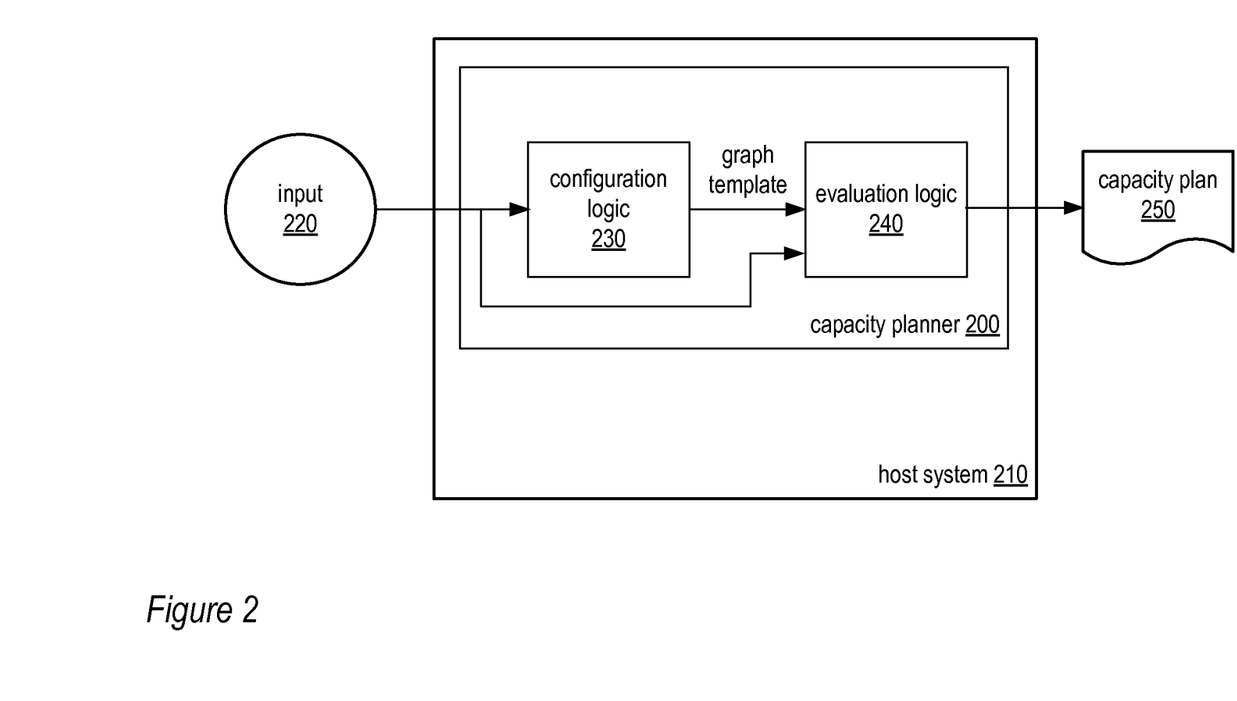
FIG. 2 illustrates an example system configuration for a capacity planner, according to some embodiments.

Various embodiments of a system and method for generating predictions for unit allocation in a materials processing network are described. As used herein, the term "unit" may include any item or material processed in materials processing network. For instance, units may include units of inventory items stored at a materials handling facility (e.g., a warehouse or distribution center). In other examples, units may include items being transported through the materials processing network, such as items transported from one materials handling facility to another materials handling facility. In various embodiments, the generation of predictions for unit flow and inventory allocation in a materials processing network may be performed by a capacity planner, such as capacity planner 200 described below. As described in more detail herein, the capacity planner may be configured to, among other things, determine the topology of a materials processing network (e.g., locations of distribution centers, fulfillment centers, cross-docking facilities, materials handling facilities or warehouses) and determine the manner in which units (e.g., units of inventory or other materials processed by the materials processing network) are to be allocated among the materials handling facilities of the materials processing network in order to meet various levels of customer demand (e.g., orders for units of inventory items within the materials processing network).

In various embodiments, the capacity planner may be configured to determine the topology of a materials processing network from a graph template that includes multiple nodes that each represents a materials handling facility. The graph template may also include multiple arcs between such nodes; each arc may represent a flow of units from one node to another node across time. For each of the nodes of the graph, the capacity planner may also include a listing of algorithms (e.g., algorithms implemented by program instructions or other instructions executable by a processor) for evaluating the arcs of the graph template to determine the quantity of units that make up a flow entering or exiting a given node. In various embodiments, the capacity planner may be configured to determine an order in which to perform such algorithms. For example, in some cases, interdependencies may exist between algorithms that require one algorithm to be performed before another algorithm (e.g., one algorithm may require a result generated by another algorithm). Accordingly, the capacity planner may be configured to avoid such issues by generating an order in which to perform the various algorithms of the graph template while avoiding such conflicts between algorithms. By performing such algorithms according to the determined order, the capacity planner may be configured to generate predictions of future unit allocation (e.g., inventory levels at the materials handling facilities of the graph template). The generation of such predictions is described in more detail herein. In some embodiments, the capacity planner may be configured to utilize such predictions to generate recommendations as to where future materials handling facilities are to be constructed.

Overview of the Materials Handling Facility

Figure 1:
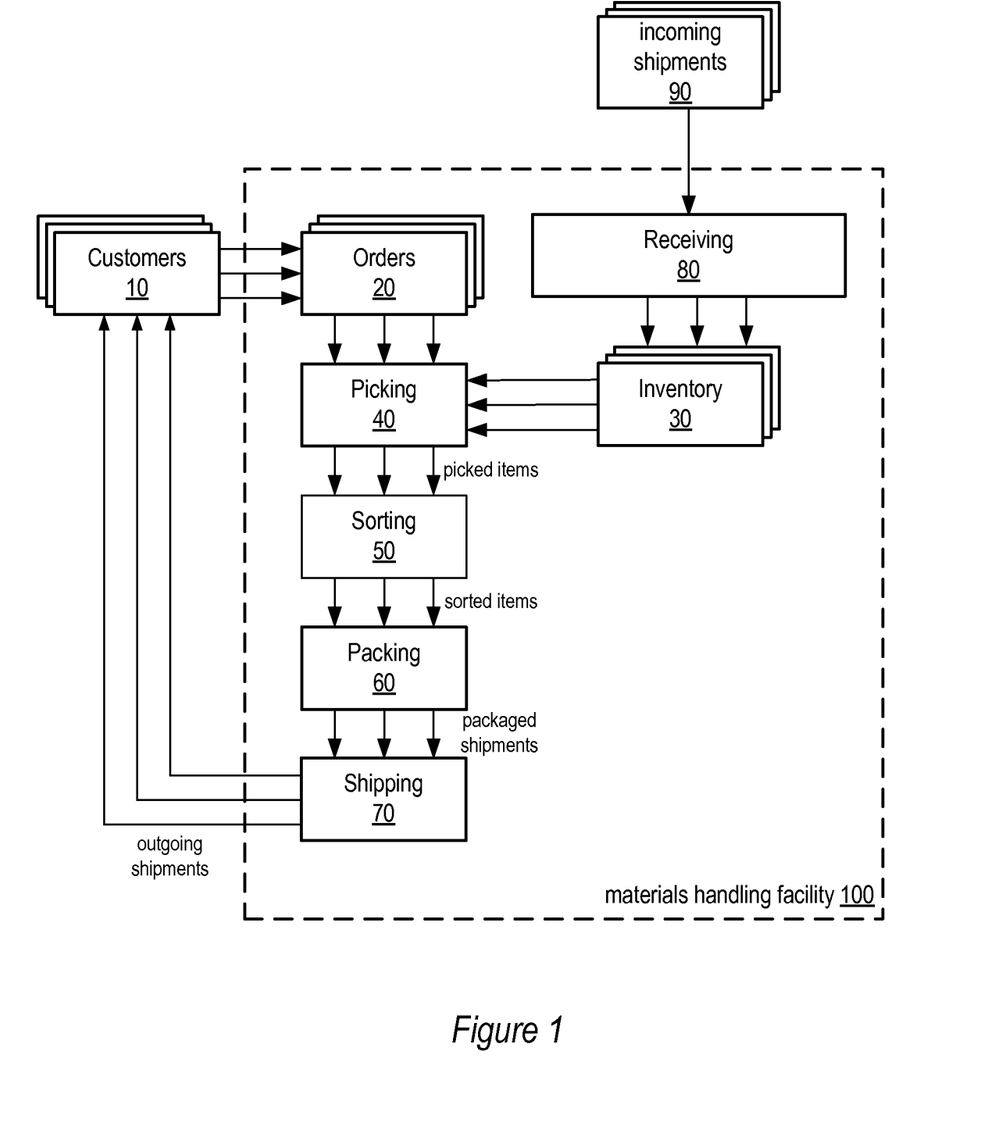
FIG. 1 illustrates a logical representation or view of the operation of an example materials handling facility, according to some embodiments.

As described above, materials processing networks may include a variety of materials handling facilities; such materials handling facilities may be configured to process units of inbound inventory for shipment to customers (and/or other materials handling facilities within the materials processing network). FIG. 1 illustrates a logical representation or view of the operation of one example of a materials handling facility 100 according to various embodiments. For example, this Figure may illustrate a materials handling facility of a product distributor or e-commerce enterprise. Multiple customers 10 may submit orders 20 to the product distributor, where each order 20 specifies one or more units of items from inventory 30 to be shipped to the customer that submitted the order. To fulfill the customer orders 20, the one or more units of items specified in each order may be retrieved, or picked, from inventory 30 (which may also be referred to as stock storage) in the materials handling facility, as indicated at 40. Picked units may be delivered or conveyed, if necessary, to one or more stations in the materials handling facility for sorting 50 into their respective orders, packing 60, and finally shipping 70 to the customers 10. In various embodiments, picked units may be delivered to an induction station, where the units are inducted into a sorting system (e.g., a sorting mechanism, sorting process, or some combination thereof). The units may then be routed to particular destinations in accordance with the requests (orders) currently being processed, e.g. to sorting stations, under direction of the control system. Various sorting mechanisms and processes (which may be represented by sorting 50) may be utilized. A picked, packed and shipped order does not necessarily include all of the units ordered by the customer; an outgoing shipment to a customer may include only a subset of the ordered units available to ship at one time from one inventory-storing location. In other cases, units of the order may be split into multiple shipments for a variety of reasons including but not limited to space and/or economic efficiency.

A materials handling facility may also include a receiving 80 operation for receiving shipments of stock from one or more sources (e.g., vendors) and for placing the received stock into stock storage. The receiving 80 operation may also receive and process returned purchased or rented units or orders from customers. At least some of these units are typically returned to inventory 30. The various operations of a materials handling facility may be located in one building or facility, or alternatively may be spread or subdivided across two or more buildings or facilities.

While the illustrated materials handling facility is configured for the fulfillment of customer orders, such a materials handling facility may also be configured to transfer units (e.g., via a carrier truck or other conveyance mechanism) to another materials handling facility within the network. In one example, a materials handling facility may serve as a distribution point or hub for the primary purpose of replenishing other materials handling facilities. In another example, a materials handling facility configured for order fulfillment may receive and fulfill a request for inventory units from another materials handling facility. Such transfers of units between materials handling facilities may be referred to herein as transshipments.

Capacity Planner

Figure 3:
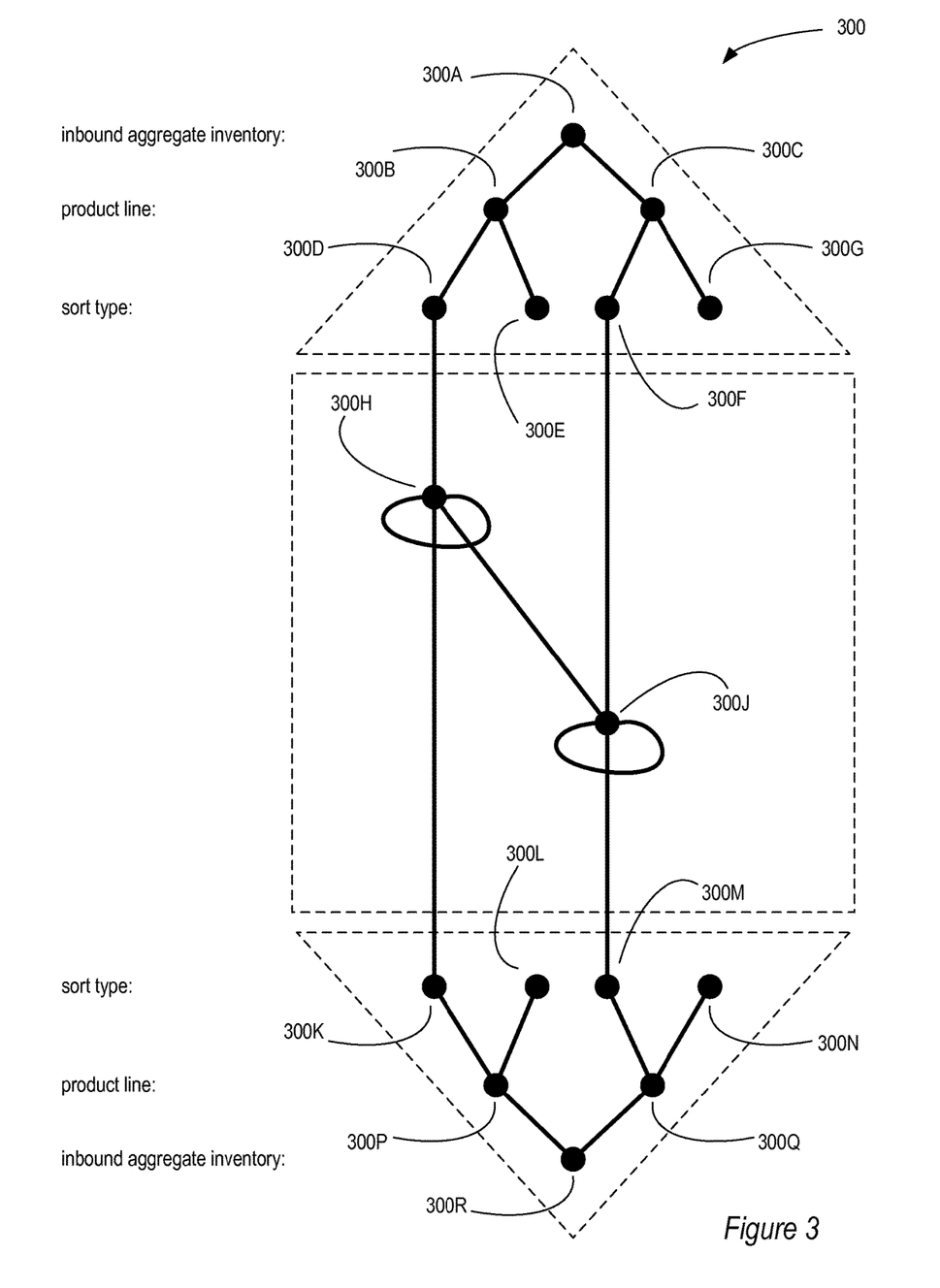
FIG. 3 illustrates an example graph template including multiple nodes that represent aggregations of materials units and/or materials handling facilities, according to some embodiments.

Referring collectively to FIGS. 2 and 3, a capacity planner and graph template are illustrated. As illustrated, capacity planner 200 may include configuration logic 230, which may be configured to generate a graph template that includes multiple nodes that each represents a materials handling facility of a materials processing network. As described in more detail with respect to FIGS. 4 and 5, this graph template may be utilized by the capacity planner to iteratively generate a capacity plan that specifies unit allocation among the materials handling facilities of the materials processing network. One example of such a graph template includes graph template 300 of FIG. 3. In the illustrated example, nodes 300H and 300J may represent a materials handling facility, such as materials handling facility 100 described above. Other nodes may represent logical aggregations of units. For example, node 300A may represent a total aggregation of units to be processed by the materials processing network, nodes 300B and 300C may represent units logically separated into product lines (e.g., books, toys, electronics, home and garden, etc.). Nodes 300D-300G may illustrate the logical separation of units into sorting categories. For instance, such nodes may represent any of: sortable items, non-sortable items, and non conveyable items. For example, items that are too large to sort via sorting mechanisms (e.g., a Crisplant® sorter) of a materials handling facility may be categorized as non-sortable. In another example, items that are too large to convey via conveyance mechanisms (e.g., a conveyance belt) may be categorized as non-sortable. The logical aggregations of units denoted by nodes 300A-300G may be configured via input 220, which may include user input and/or machine input to which configuration logic 230 is responsive. For instance, in various embodiments, configuration logic 230 may receive input 220 and generate a data structure representing graph template 300 in accordance with such input. In various embodiments, input 220 may include input received via a graphical user interface or a command line interface, or some other interface for inputting data into a computer system. In general, any logical categorization of units (e.g., categorization by product category, by sortability, by historical sales volume or "popularity," by price, etc.) may be specified via input 220.

Nodes 300K-300R may represent logical categorizations (or "aggregations") of units that are similar to the categorizations described above for nodes 300A-300G. In contrast to nodes 300A-300G, which denote categorizations for units coming into the materials processing network (or already exist within such network), nodes 300K-300R may represent logical aggregations of units that are exiting the materials processing network (or have already exited the network), examples of which include items packaged and shipped to customers that submitted orders to the materials processing network (or to the distributor controlling the materials processing network).

As described above, various "arcs" or "flows" of items may be defined between nodes of graph template 300. For instance, such flows may represent a flow of units from one node to another node. For each of the nodes of the graph, the capacity planner may also include a listing of algorithms (e.g., program instructions or other instructions executable by a processor) for evaluating the arcs of the graph template to determine the quantity of units that make up a flow entering or exiting a given node. Examples of such algorithms may include a shipment forecast algorithm that may be utilized by capacity planner 200 to determine a prediction as to the quantity and/or composition (e.g., stock keeping units) of units to be shipped from a given materials handling facility to customers that purchased items. In another example, a transshipment forecast algorithm may be utilized by capacity planner 200 to determine a prediction as to the quantity and/or composition of units to be shipped from a given materials handling facility to another materials handling facility (e.g., a materials handling facility running low on inventory of a particular item).

Note that a given arc may be referenced by the nodes residing on the ends of such arc. For example, the arc between node 300H and node 300J may be referenced by the label arc (or flow) 300HJ. Further note that the graph template of FIG. 3 is an unevaluated template, which may be considered a blueprint or template for generating a capacity plan, such as capacity plan 250. Note that graph template 300 is not a graph itself; instead evaluation logic 240 may generate a capacity plan 250 based on such template, as described in more detail below. Also note that arcs of the graph template may be valid for a given time period (e.g., a week, a month, or some other time period), which may in many embodiments mean that flows may be expressed as a given quantity of units transferred in a that period of time (e.g., 5,000 units of inventory per week). Also note that in the illustrated embodiment, arcs that loopback to their origination node, such as flow 300HH and flow 300JJ of may represent a quantity of inventory that remains at that node for the entirety of the time period associated with the arc.

Evaluation logic 240 may be configured to generate a capacity plan 250 based on graph template 300 and in some cases based on one or more portions of input 220. In various embodiments, the capacity plan may specify a predicted amount of inventory units at one or more of the materials handling facilities of the graph template. Such predicted amounts of inventory units may be provided for each of one or more instances in time and/or periods of time.

In various embodiments, evaluation logic 240 may be configured to generation such capacity plan in an iterative fashion, as described in more detail herein. For example, evaluation logic 240 may be configured to determine a set of initial conditions for the graph (e.g., such initial conditions may be included within input 220). The initial conditions may include a measure or predicted quantity of units for each node of the graph template (e.g., for each materials handling facility and/or logical aggregation of inventory units that corresponds to a node of the graph template). The evaluation logic 240 may also be configured to execute one or more sets of program instructions (which may each represent an algorithm) to determine the flows of units entering and exiting the nodes during a given time period. For each node, the evaluation logic may be configured to determine the inventory units located at that node at the end of such time period by adding units entering a node to the inventory units present at that node at the beginning of the time period to determine a resultant quantity and by subtracting from that resultant quantity the units exiting the node during the given time period. The evaluation logic 240 may be configured to repeat this process for subsequent time periods which may be of uniform or varying lengths. This process is described in more detail with respect to FIGS. 4 and 5.

Various sets of executable instructions (e.g., algorithms) may be performed to determine the various flows of units into and/or out of a given node of the graph on which the capacity plan is based. One example of such an algorithm includes a shipment forecast algorithm that determines the quantity of units shipped from a given materials handling facility (which corresponds to a node of the graph template) to customers during a particular time period. Another example of an algorithm that may be performed by the capacity planner may include a transfer or transshipment estimation algorithm that determines the quantity of units shipped from one materials handling facility to another materials handling facility. In various embodiments, the capacity planner may be configured to perform a demand allocation algorithm which may be configured to determine, for a given quantity of demand (e.g., inventory units), the particular materials handling facilities (represented by nodes in the graph) that will process portions of that demand. Such a demand allocation algorithm may assign specific materials handling facilities to fulfill a specific amount of demand (e.g., units) based on various factors including estimations of resources at a given materials handling facility. Such resources may in various embodiments include labor resources and/or equipment resources.

In various embodiments, the capacity planner may be configured to perform additional algorithms (e.g., a set of executable program instructions) to determine information other than quantity of units entering or exiting a given node. For example, in some embodiments, the capacity planner may be configured to perform an outbound shipment cost algorithm to determine an estimation of shipping costs for a given time period. For instance, the capacity planner may be configured to determine the aggregate amount of shipments of items predicted to exit the materials processing network (e.g., shipped to customers) and multiply the aggregate amount by an estimated average shipment cost to determine an aggregate shipping costs for a given time period. This information may also be included within capacity plan 250.

Note that in various embodiments the capacity planner may be configured to treat such algorithms as modular in nature. For instance, in various embodiments, the capacity planner may at any time substitute an algorithm of a given type (e.g., a shipment forecast algorithm) with another algorithm of the same type. In various embodiments, input 220 may specify which algorithms should be performed for a given node of the graph template.

In various embodiments, capacity planner 200 may be configured to determine an order in which to perform such algorithms. For example, in some cases, interdependencies may exist between algorithms that require one algorithm to be performed before another algorithm (e.g., one algorithm may require a result generated by another algorithm). For example, the demand allocation algorithm described above may need to be performed prior to the shipment forecast algorithm. For instance, the shipment forecast algorithm may in some embodiments require a value specifying the quantity of units entering a materials handling facility prior to determining the quantity of inventory items to be shipped from that materials handling facility. Accordingly, the capacity planner may be configured to avoid the above-described conflicts between algorithms by generating an order in which to perform the various algorithms of the graph template while avoiding such conflicts between algorithms.

Figure 4:
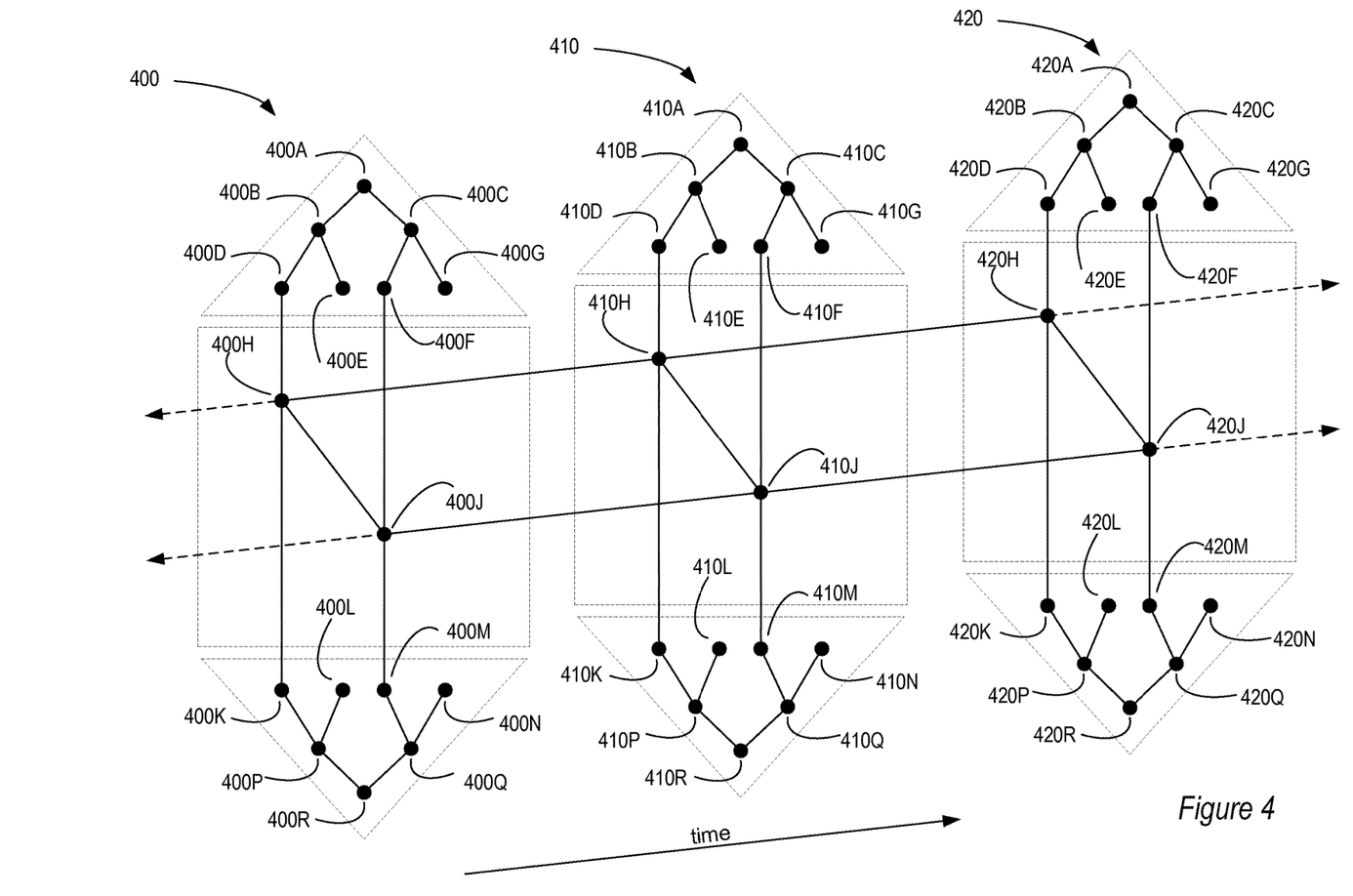
FIG. 4 illustrates an example visual representation of a data structure that defines a portion of a graph generated by a capacity planner, according to some embodiments.

FIG. 4 illustrates a representation of a graph defined by a data structure that may be generated by the capacity planner. Note that FIG. 4 illustrates only a portion of a graph that may be generated by the capacity planner. More specifically, FIG. 4 illustrates three graph components (e.g., graph component 400, graph component 410, and graph component 420) that may be components of a larger graph that includes other graph components. As described above, capacity planner 200 may be configured to generate an entire graph in an iterative fashion, which may in various embodiments mean that the capacity planner 200 may be configured to generate a graph that spans a given time period (e.g., one year) by generating one or more graph components that each correspond to a smaller time period within the given time period (e.g., one week).

Note that in various embodiments the structure of each graph component 400-420 corresponds to the structure of the graph template 300. Also note that the graph components of FIG. 4 may differ from the template of FIG. 3 since graph components may include values (not illustrated) for the arcs or flows between nodes. For instance, as capacity planner performs the algorithms that are specified to be performed for each node as described above, the capacity planner may record within capacity plan 250 resultant values that represent transfers of units between nodes of the graph component. Such transfers of units may correspond to the movement of units from a first physical location to another physical location, as illustrated by the transshipment of units from the materials handling facilities corresponding to 400H to 400J. In other embodiments, such transfers of units may correspond to the movement of units among logical aggregations of the graph, as illustrated by the "transfer" of units from node 400A to node 400B to node 400D.

Also note that nodes from separate graph components may represent the same materials handling facility at different periods of time. For example, nodes 400H, 410H, and 420H may represent the same materials handling facility at different periods of time. In general, each of nodes 400A-R correspond to similarly numbered nodes of nodes 410A-R and 420A-R. Additionally, various flows may span multiple time periods. For instance, the flow extending from node 400H to node 410H may represent inventory stored within the same materials handling facility at the end of the time period corresponding to graph component 400. Since the time periods corresponding to graph components may be contiguous, the inventory units stored at the materials handling facility at the end of such time period may be equivalent to the inventory units stored within the same materials handling facility at the beginning of the time period corresponding to graph component 410.

Figure 5:
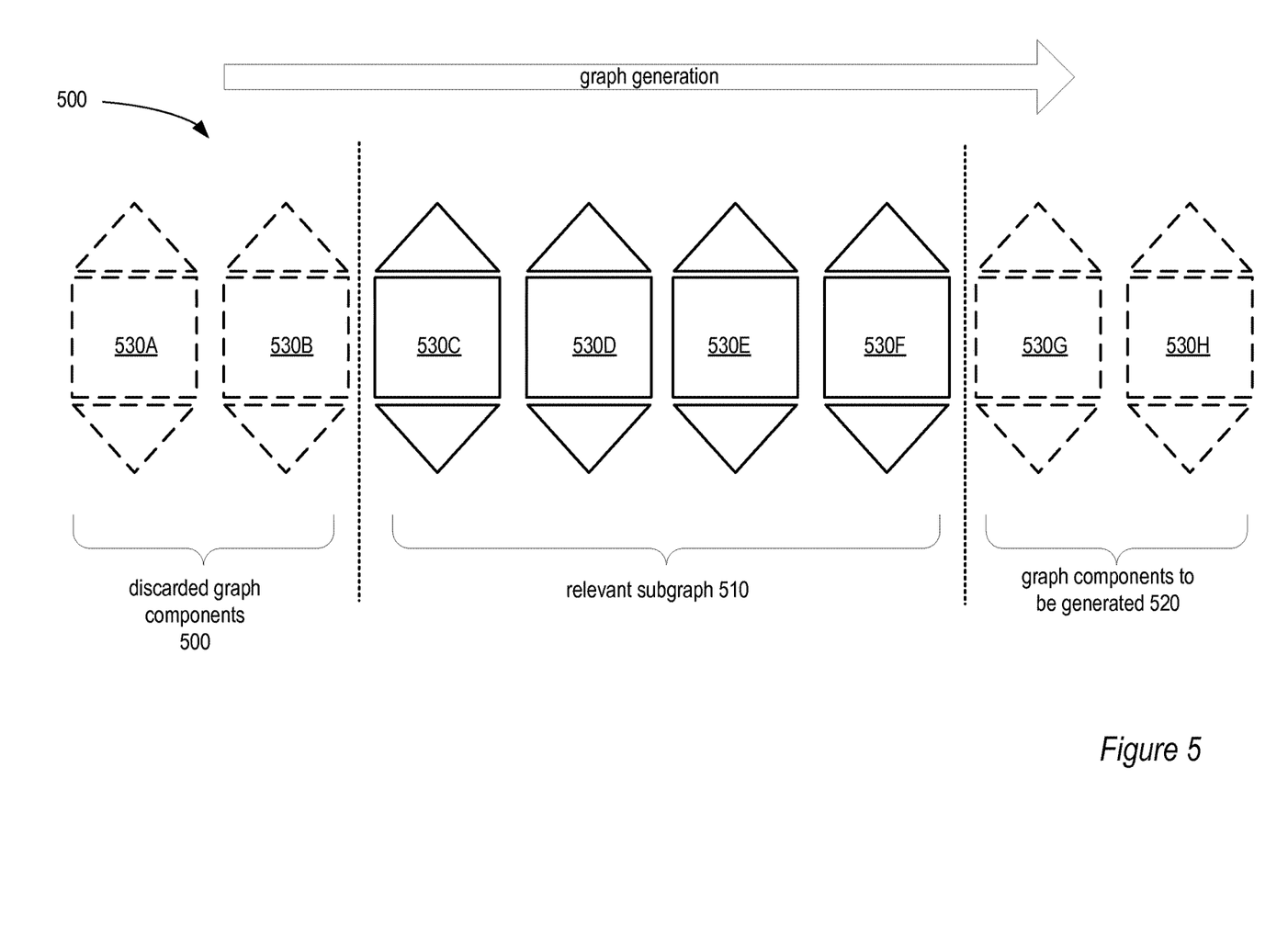
FIG. 5 illustrates an example visual representation of a data structure that defines a graph generated by a capacity planner, according to some embodiments.

FIG. 5 illustrates a graphical representation of the manner in which capacity planner may be configured to generate a graph for a particular time period. As described above, evaluation logic 240 may be configured to generation capacity plan 250 in an iterative fashion. For example, the evaluation logic may be configured to determine a set of initial conditions for the graph. The initial conditions may include a measure or predicted quantity of inventory for each node of the graph template (e.g., for each materials handling facility and/or logical aggregation of inventory units that corresponds to a node of the graph template). The evaluation logic 240 may also be configured to execute one or more sets of program instructions (which may each represent an algorithm) to determine the flows of units entering and exiting the nodes during a given time period. For example, in the illustrated embodiment, each graph component 530A-530H may correspond to a separate one of multiple time periods that collectively make up a larger time period. For each node of graph component 530A, the evaluation logic may be configured to determine the inventory units located at that node at the end of the corresponding time period by adding units entering a node to the inventory units present at that node at the beginning of the time period to determine a resultant quantity and by subtracting from that resultant quantity the units exiting the node during the given time period. In various embodiments, the results of this process may be utilized by the capacity planner for subsequent graph components, such as graph component 530B, 530C and so on.

As the capacity planner is performing the various algorithms associated with each node in order to determine the corresponding flows between nodes, the capacity planner may only need values from relevant graph components (which may be a subset of the graph components that make up an entire graph). For example, in the illustrated embodiment, the capacity planner may currently be performing algorithms to evaluate the flows of graph component 530E. However, in some cases, in order to perform such algorithms, the capacity planner may only need values from one or more subsequent graph components and one or more previous graph components (not the entire graph). Accordingly, the capacity planner may be configured to keep only a relevant subgraph 510 within memory of host system 210. As illustrated, relevant subgraph 510 includes only a portion of the graph (e.g., graph components 530C-F). In the illustrated embodiment, the capacity planner may discard graph components that include information no longer needed by the capacity planner, as illustrated by discarder graph component 500. Furthermore, the relevant subgraph 510 may serve as a sliding window of graph components that are stored in memory. For example, as capacity planner 200 progresses through the performance of the various algorithms described above, the oldest graph components of the relevant subgraph may be discarded (e.g., subgraph 530C-D) and graph component to be generated (e.g., 520) may be added to the relevant subgraph, which is stored in memory. In this way, host system 210 does not need to include memory for storing the entire graph 500. Additionally, in some embodiments, discarded graph components 500 may be deleted from memory and/or archived elsewhere for later retrieval (e.g., for error checking or other diagnostic purposes).

Also note that while the capacity planner is described above as generating graph components from the same graph template (e.g., graph template 300 of FIG. 3), the capacity planner may be configured to generate a graph based on multiple different graph templates. For example, in some cases, there may be plans to add a materials handling facility to the materials processing network at a later point in time. Accordingly, a graph template that is different than graph template 300 may be generated (e.g., base don input 220) by the capacity planner. Additionally, input 220 may also specify a point in time at which the different graph template is to replace the previous graph template (e.g., graph template 300). For example, the capacity planner may be configured to generate graph components 530A-530D based on graph template 300 and generate graph components 530E-530H based on a different graph template, such as a graph template that includes an additional node representing the addition of another materials handling facility to the materials processing network. In the example described above, a change to the materials processing network would not require the capacity planner to regenerate the entire graph. For example, a conventional graph solver may regenerate the entire graph in response to a modification of one or more nodes of a graph. However, the capacity planner described herein may be configured reuse a valid portion of a previously generated graph, which in this example may include the portion of the graph corresponding to graph components 530A-530D. From this portion, the capacity planner may begin further calculations to generate graph components 530E-530H based on the different graph template. In other examples, nodes may be removed from graph templates in order to illustrate the temporary or permanent closing of a materials handling facility.

In various embodiments, the capacity planner may be configured to apply constraints to various flows of the graph. For example, a given materials handling facility may have a maximum output of a particular amount of items shipped for a given time period. In some cases, for a given amount of demand (e.g., items to be shipped), a shipment forecast algorithm performed by the capacity planner may determine that a materials handling facility is to ship a specific quantity of inventory units to customers. If such quantity of inventory units is larger than a constraint placed on the corresponding flow (e.g., a flow corresponding to items shipped from the materials handling facility), the capacity planner may be configured to reassign such demand to another materials handling facility that has the capacity to fulfill such demand.

In various embodiments, the time periods to which each of the graph components 530A-530H may not be uniform in nature. For instance, the time periods for which graph components 530A-530C are valid may be one month whereas the time periods for which graph components 530D-530H are valid may be one day. In general any combination of time period lengths may be employed for a given graph. Such settings may be configured via input 220. For example, in some embodiments, finely grained time periods may be utilized around periods of high demand or high volatility (e.g., holiday seasons). In other cases, more coarsely grained time periods may be sufficient (e.g., during periods of low demand or low volatility).

Also note that in various embodiments, nodes of graph templates and graph components may be utilized to represent resources at having a finer granularity than a materials handling facility. For example, in some embodiments, nodes of graphs may be utilized to represent resources within a materials handling facility, such as different inventory locations or equipment (e.g., automated sorters, manual sortation stations, etc.). In general, a given node may be utilized by the capacity planner to model any resource that processes units in a materials processing network.

Figure 6:
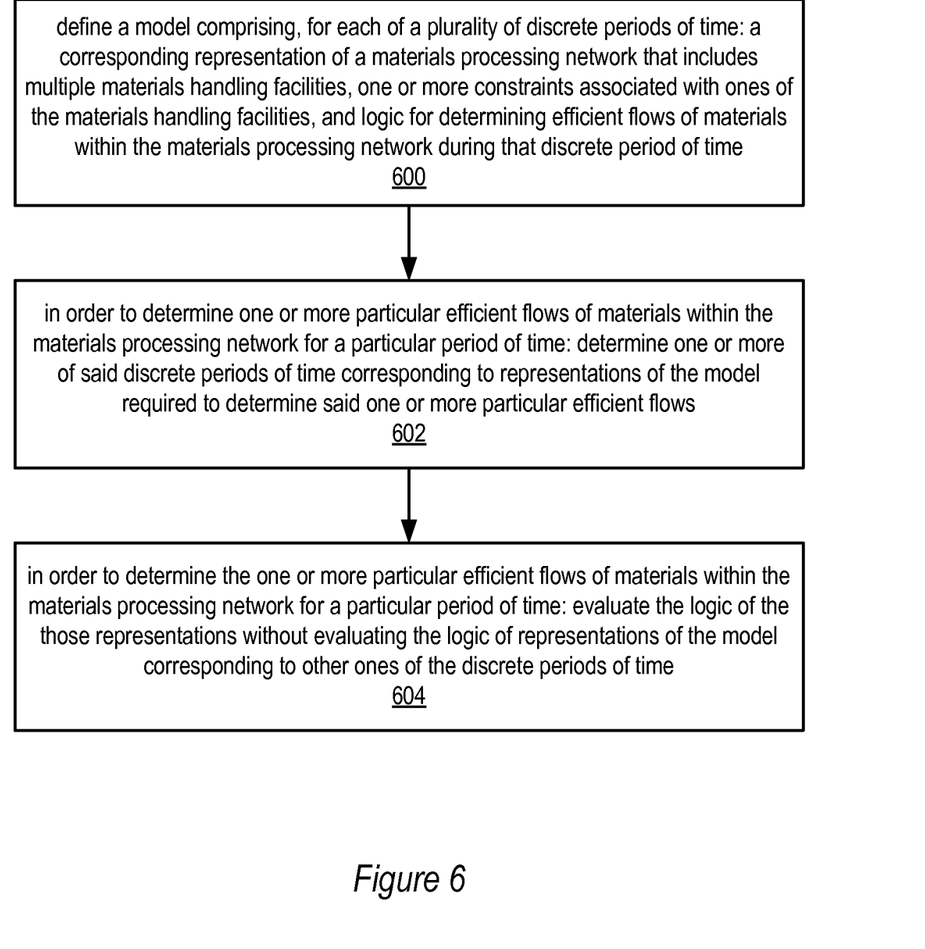
FIG. 6 illustrates a flowchart of an example method that may be performed by a capacity planner, according to some embodiments.

FIG. 6 illustrates a flowchart of an example method according to various embodiments. In various embodiments, the illustrated method may be performed by the capacity planner described herein. As illustrated by block 600, the method may include defining a model of the materials processing network. One example of such a model includes the data evaluated by capacity planner 200 described above. The model may include, for each of multiple discrete periods of time, a corresponding representation of a materials processing network that includes multiple materials handling facilities. An example of such a representation is illustrated by the graph template of FIG. 3. As is the case for the graph templates the representations of the model may include nodes and arcs as described above with respect to FIG. 3. Note that while such examples are illustrated as graphical representations that include multiple nodes and arcs, such representation need not be graphical in nature according to various embodiments. For example, the method may include generating a stored data structure that includes multiple stored representations of the model, each of which may be specific to a particular time period.

The method may also include generating the model such that the model includes, for each of the multiple discrete periods of time, one or more constraints associated with one or more of the materials handling facilities of the materials processing network. In one example, a constraint may include a constraint on the storage capacity (e.g., measured in units or volume) of one or more materials handling facilities. For instance, a warehouse that distributes units to other materials handling facilities may have a much larger storage capacity than a materials handling facility that directly services end-customers. The method may include generating a model that takes such differences into consideration through the utilization of storage capacity constraints on the model. In another example, a constraint may include a constraint on materials processing throughput of a materials handling facility of the materials processing network. For instance, due to variations among resources (e.g., variations due to different sorting equipment, facility size, inventory, labor, and other characteristics), various materials handling facilities may process materials at different rates. Other types of constraints may also be utilized including but not limited to cost constraints (e.g., operating costs or shipping costs) associated with processing materials as well as labor constraints (e.g., the amount of labor available at a given materials handling facility).

The method may also include generating the model such that the model includes, for each of the multiple discrete periods of time, logic for determining efficient flows of materials within the materials processing network during that discrete period of time. For example, such logic may in various embodiments include program instructions for implementing any of the various algorithms described above, such as the shipment forecast algorithm, the transfer or transshipment estimation algorithm, and the demand allocation algorithm, each of which are described in more detail above. In various embodiments, the logic and/or algorithms described herein may correspond to the various graph arcs described above.

As illustrated by block 602, the method may also include determining one or more particular efficient flows of materials within the materials processing network for a particular period of time. The one or more efficient flows may represent an optimal (or near optimal) allocation of material flow with respect to the resources (e.g., materials handling facilities, transportation resources, or some other resource) of the materials processing network. In one embodiment, the efficient flows may be compared to one or more metrics for determining efficiency. For example the method may include determining that a flow meets a requisite utilization rate with respect to one or more metrics of the materials processing network. For instance, such a utilization rate may specify a minimum utilization rate of storage capacity, labor, machinery (e.g., a Crisplant sorter or other type of sorter, conveyance systems, or other machinery), throughput or some other characteristic or resource of the materials processing network.

To determine the one or more efficient flows, the method may include determining one or more of the discrete periods of time that correspond to representations of the model required to determine the one or more efficient flows. For example, such representations of the model required to determine the one or more efficient flows may correspond to the graph components of relevant subgraph 510 described above. In various embodiments, the method may determine such periods of time by identifying the periods of time associated with representations of the model that include data required by the logic for determining the particular efficient flows. For example, the method may include determining such periods of time by determining the periods of time that correspond to graph components of relevant subgraphs, such as relevant subgraph 510 of FIG. 5. In some embodiments, the method may include discarding representations that are not required to determine the one or more efficient flows, such as discarded graph components 500 described above.

As illustrated by block 604, the method may include evaluating the logic of the representations that correspond to the determined discrete periods of time (e.g., the periods of time relevant to calculating the one or more efficient flows) without evaluating the logic of representations of the model that correspond to other ones of the discrete time periods. For example, as illustrated in FIG. 5, the evaluation of the model may only include evaluating the representations of relevant subgraph 510 while not evaluating discarded graph components 500 and graph components 520.

In various embodiments, the method may also include providing a user interface (e.g., a graphical user interface or command line interface) configured to initiate one or modifications of the model. In some embodiments, the method described above may include determining the one or more efficient flows based on such a modified version of the model. In various embodiments, such modification may include a modification to one or more of the representations of the model, which may include, e.g., adding or removing nodes (e.g., materials handling facilities) or arcs between nodes. In one example, the method may include modifying or replacing (e.g., in response to user input of the user interface) the logic of the model. For instance, various algorithms (e.g., shipment forecast algorithms or any other algorithm described herein) may be substituted for algorithms of the same type (or another type of algorithm altogether).

Exemplary System

Various embodiments of a system and method for generating predictions for unit allocation in a materials processing network, as described herein, may be executed on one or more computer systems, which may interact with various other devices. One such computer system is computer system 900 illustrated by FIG. 7, which in the illustrated example may implement host system 210 of FIG. 2. Computer system 900 may be capable of implementing a capacity planner, such as capacity planner 200. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

Figure 7:
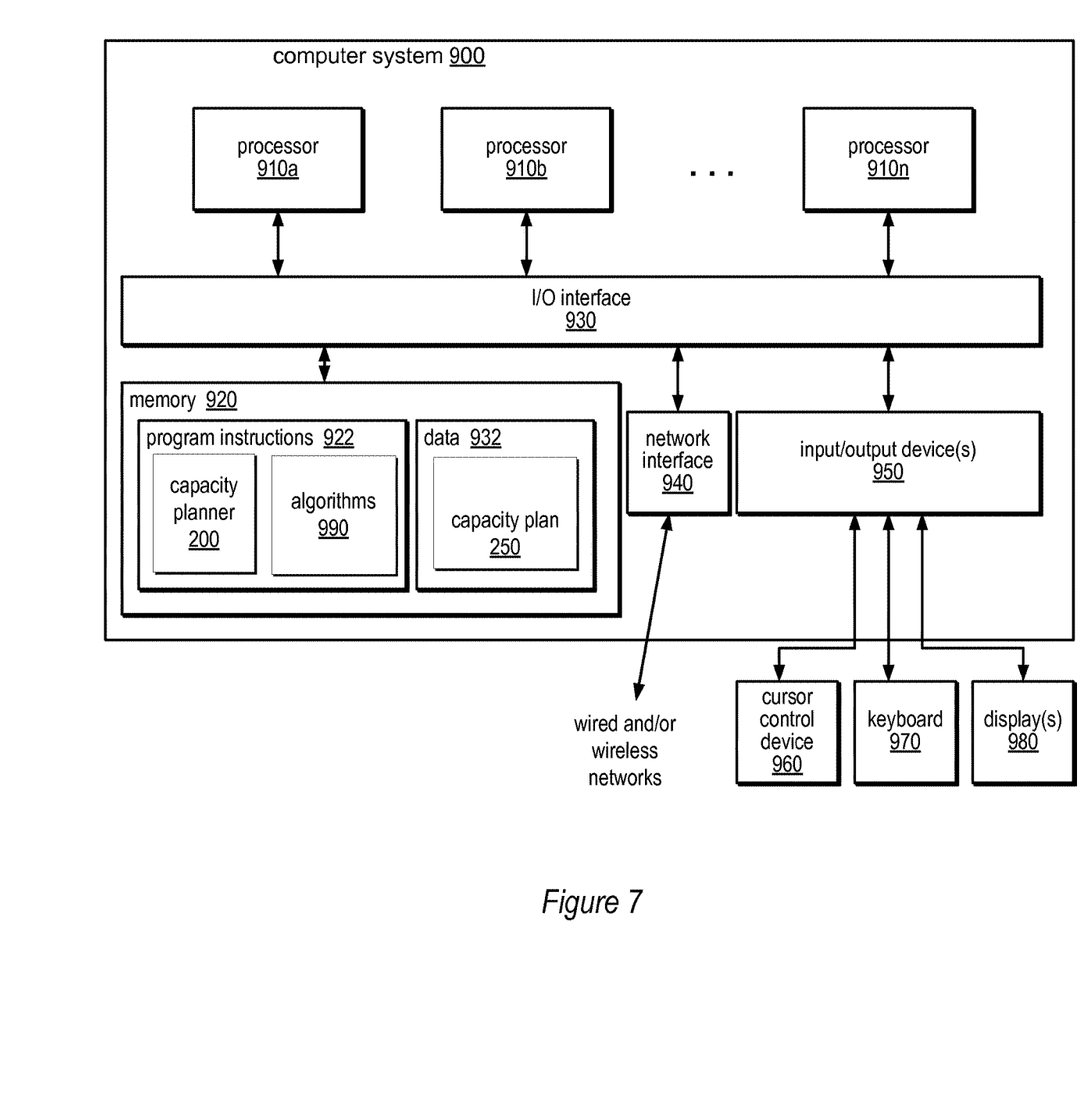
FIG. 7 illustrates an example system suitable for implementing any of the various elements of the system and method for generating predictions for unit allocation in a materials processing network, according to various embodiments.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a capacity planner, such as capacity planner 200 described above, are shown stored within system memory 920 as capacity planner 200. Furthermore, program instructions and data implementing the various algorithms described above (e.g., shipment forecast algorithms, etc.) are illustrated as algorithms 990 stored within memory 920. Additionally, a capacity plan 250 (which may be generated by planner 200) may be stored with data 932 of memory 920. Such capacity plan may include any of the graphs described above (e.g., graphs of FIGS. 4 and 5) as well as any other results generated by capacity planner described above. Furthermore, memory 920 may also include one or more graph templates, such as the graph template of FIG. 3. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 7, memory 920 may include program instructions 922 configured to implement a capacity planner, such as capacity planner 200. In one embodiment, capacity planner 200 may implement the methods described above, such as the method illustrated by FIG. 6. In other embodiments, different elements and data may be included. As illustrated, note that data 932 may include a capacity plan 250, which may include any result generated by planner 200.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
one or more hardware processors; and
a non-transitory memory coupled to the one or more hardware processors, wherein the non-transitory memory stores program instructions executable by the one or more hardware processors to implement a capacity planner configured to:
define a model comprising, for each of a plurality of discrete periods of time:
a corresponding representation of a fulfillment network that includes one or more model components that represent multiple fulfillment centers configured to process received inventory items for subsequent fulfillment of customer orders of the inventory items,
one or more constraints that are characteristic of ones of the fulfillment centers or characteristic of the inventory items, and
logic for determining efficient flows of the inventory items within the fulfillment network during that discrete period of time, wherein the logic comprises one or more algorithms associated with respective ones of the one or more model components of the representation, and wherein the multiple fulfillment centers of the fulfillment network are maintained by a same product distributor;
in order to determine one or more particular efficient flows of the inventory items within the fulfillment network for a particular period of time, wherein at least some of the inventory items flow from one or more fulfillment centers within the fulfillment network to one or more other fulfillment centers within the fulfillment network:
determine one or more of said discrete periods of time corresponding to representations of the model required to determine said one or more particular efficient flows;
discard, based on the determined one or more discrete periods of time, one or more model components that are no longer needed for the determination of the one or more efficient flows, wherein the discarded model components correspond to other ones of the discrete periods of time, wherein based at least in part on the discarded model components the system does not need memory for storing the entire graph, and wherein memory associated with the discarded one or more model components is made available based at least in part on the discard;
determine an order in which to perform algorithms associated with one or more of the remaining model components based at least in part on interdependencies between the algorithms; and
evaluate the logic of the representations based at least in part on the determined order of the algorithms and without evaluating the discarded one or more components of the model corresponding to the other ones of the discrete periods of time; and specify a capacity plan based at least in part on said determination of one or more particular efficient flows of the inventory items within the fulfillment network for the particular period of time, wherein said capacity plan comprises predicted allocations of inventory items among the fulfillment centers of the fulfillment network, estimated outbound shipment costs for the fulfillment network, or a recommended topology for the fulfillment network;

wherein the program instructions are further executable by the one or more hardware processors to, in accordance with the specified capacity plan, either: cause inventory to be stocked among the fulfillment centers of the fulfillment network, or cause implementation of the recommended topology of the fulfillment network.

2. The system of claim 1, wherein said one or more constraints comprise a constraint on at least one of:
a storage capacity of one or more fulfillment centers; or
a materials processing throughput of one or more fulfillment centers.

3. The system of claim 1, wherein the capacity planner comprises a user interface configured to initiate one or more modifications to the model.

4. The system of claim 3, wherein the capacity planner is configured to perform the determination of the one or more particular efficient flows of the inventory items based on the modified model.

5. The system of claim 3, wherein said one or more modifications comprise a modification to one or more of said representations of the fulfillment network.

6. The system of claim 5, wherein said one or more modifications comprise modifying one or more of said representations to represent one or more additional fulfillment centers.

7. The system of claim 3, wherein said one or more modifications comprise a modification or replacement of at least a portion of said logic for determining efficient flows of the inventory items within the fulfillment network.

8. The system of claim 1,
wherein at least some of said representations comprise a plurality of nodes each corresponding to a fulfillment center, and a plurality of arcs between fulfillment centers; and
wherein each arc represents a flow of materials to be determined by the capacity planner.

9. The system of claim 1, wherein for one or more of the plurality of discrete time periods, the corresponding logic for determining efficient flows of the inventory items includes logic for determining a forecast of materials to be shipped from one or more fulfillment centers within the fulfillment network.

10. A computer-implemented method, comprising:
performing, by a capacity planner implemented via one or more computing devices comprising one or more hardware processors and non-transitory memory:
creating, by the capacity planner, a model comprising, for each of a plurality of discrete periods of time:
a corresponding representation of a fulfillment network that includes one or more model components that represent multiple fulfillment centers configured to process received inventory items for subsequent fulfillment of customer orders of the inventory items,
one or more constraints that are characteristic of ones of the fulfillment centers or characteristic of the inventory items, and
logic for determining efficient flows of the inventory items within the fulfillment network during that discrete period of time, wherein the logic comprises one or more algorithms associated with respective ones of the one or more model components of the representation, and wherein the multiple fulfillment centers of the fulfillment network are maintained by a same product distributor;

determining, by the capacity planner, one or more particular efficient flows of the inventory items within the fulfillment network for a particular period of time, wherein at least some of the inventory items flow from one or more fulfillment centers within the fulfillment network to one or more other fulfillment centers within the fulfillment network, and wherein said determining one or more particular efficient flows comprises:
determining one or more of said discrete periods of time corresponding to representations of the model required to determine said one or more particular efficient flows;
discarding, based on the determined one or more discrete periods of time, one or more model components that are no longer needed for the determination of the one or more efficient flows, wherein the discarded model components correspond to other ones of the discrete periods of time, wherein based at least in part on the discarded model components the system does not need memory for storing the entire graph, and wherein memory associated with the discarded one or more model components is made available based at least in part on the discarding;
determining an order in which to perform algorithms associated with one or more of the remaining model components based at least in part on interdependencies between the algorithms and
evaluating the logic of the representations based at least in part on the determined order of the algorithms and without evaluating the discarded one or more model components of the model corresponding to the other ones of the discrete periods of time;

wherein said creating and said determining one or more particular efficient flows are performed using one or more computer systems;

specifying, by the capacity planner, a capacity plan based at least in part on said determining one or more particular efficient flows of the inventory items within the fulfillment network for a particular period of time, wherein said capacity plan comprises predicted allocations of inventory items among the fulfillment centers of the fulfillment network, estimated outbound shipment costs for the fulfillment network, or a recommended topology for the fulfillment network; and in accordance with the specified capacity plan: causing inventory to be stocked among the fulfillment centers of the fulfillment network, or causing implementation of the recommended topology of the fulfillment network.

11. The computer-implemented method of claim 10, wherein said one or more constraints comprise a constraint on at least one of: a storage capacity of one or more fulfillment centers, a materials processing throughput of one or more fulfillment centers, a cost of transporting materials, and labor for processing materials.

12. The computer-implemented method of claim 10, further comprising performing one or more modifications to the model in response to input from a user interface.

13. The computer-implemented method of claim 12, wherein the determination of the one or more particular efficient flows is based on the modified model.

14. The computer-implemented method of claim 12, wherein said one or more modifications comprise a modification to one or more of said representations of the fulfillment network.

15. The computer-implemented method of claim 14, wherein performing the one or more modification comprises modifying one or more of said representations to represent one or more additional fulfillment centers.

16. The computer-implemented method of claim 12, wherein performing said one or more modifications comprises modifying or replacing at least a portion of said logic for determining efficient flows of the inventory items within the fulfillment network.

17. The computer-implemented method of claim 10,
wherein at least some of said representations comprise a plurality of nodes each corresponding to a fulfillment center, and a plurality of arcs between fulfillment centers; and
wherein each arc represents a flow of materials.

18. The computer-implemented method of claim 10, wherein for one or more of the plurality of discrete time periods, the corresponding logic for determining efficient flows of the inventory items includes logic for determining a forecast of materials to be shipped from one or more fulfillment centers within the fulfillment network.

19. A non-transitory computer-readable storage medium storing program instructions computer-executable by one or more hardware processors to implement a capacity planner configured to:
define a model comprising, for each of a plurality of discrete periods of time:
a corresponding representation of a fulfillment network that includes one or more model components that represent multiple fulfillment centers configured to process received inventory items for subsequent fulfillment of customer orders of the inventory items,
one or more constraints that are characteristic of ones of the fulfillment centers or characteristic of the inventory items, and
logic for determining efficient flows of the inventory items within the fulfillment network during that discrete period of time, wherein the logic comprises one or more algorithms associated with respective ones of the one or more model components of the representation, and wherein the multiple fulfillment centers of the fulfillment network are maintained by a same product distributor;
in order to determine one or more particular efficient flows of the inventory items within the fulfillment network for a particular period of time, wherein at least some of the inventory items flow from one or more fulfillment centers within the fulfillment network to one or more other fulfillment centers within the fulfillment network:
determine one or more of said discrete periods of time corresponding to representations of the model required to determine said one or more particular efficient flows;
discard, based on the determined one or more discrete periods of time, one or more model components that are no longer needed for the determination of the one or more efficient flows, wherein the discarded model components correspond to other ones of the discrete periods of time wherein based at least in part on the discarded model components the system does not need memory for storing the entire graph, and wherein memory associated with the discarded one or more model components is made available based at least in part on the discard;
determine an order in which to perform algorithms associated with one or more of the remaining model components based at least in part on interdependencies between the algorithms; and
evaluate the logic of the representations based at least in part on the determined order of the algorithms and without evaluating the discarded one or more components of the model corresponding to the other ones of the discrete periods of time; and
specify a capacity plan based at least in part on said determination of one or more particular efficient flows of the inventory items within the fulfillment network for the particular period of time, wherein said capacity plan comprises predicted allocations of inventory items among the fulfillment centers of the fulfillment network, estimated outbound shipment costs for the fulfillment network, or a recommended topology for the fulfillment network;
wherein the program instructions are further computer-executable by one or more hardware processors to, in accordance with the specified capacity plan, either: cause inventory to be stocked among the fulfillment centers of the fulfillment network, or cause implementation of the recommended topology of the fulfillment network.

20. The non-transitory medium of claim 19, wherein said one or more constraints comprise a constraint on at least one of: a storage capacity of one or more fulfillment centers, a materials processing throughput of one or more fulfillment centers, a cost of transporting materials, and labor for processing materials.

21. The non-transitory medium of claim 19, wherein the capacity planner comprises a user interface configured to initiate one or more modifications to the model.

22. The non-transitory medium of claim 21, wherein the capacity planner is configured to perform the determination of the one or more particular efficient flows of the inventory items based on the modified model.

23. The non-transitory medium of claim 21, wherein said one or more modifications comprise a modification to one or more of said representations of the fulfillment network.

24. The non-transitory medium of claim 23, wherein said one or more modifications comprise modifying one or more of said representations to represent one or more additional fulfillment centers.

25. The non-transitory medium of claim 21, wherein said one or more modifications comprise a modification or replacement of at least a portion of said logic for determining efficient flows of the inventory items within the fulfillment network.

26. The non-transitory medium of claim 19,
wherein at least some of said representations comprise a plurality of nodes each corresponding to a fulfillment center, and a plurality of arcs between fulfillment centers; and
wherein each arc represents a flow of materials to be determined by the capacity planner.

27. The non-transitory medium of claim 19, wherein for one or more of the plurality of discrete time periods, the corresponding logic for determining efficient flows of the inventory items includes logic for determining a forecast of materials to be shipped from one or more fulfillment centers within the fulfillment network.

\* \* \* \* \*